July 29, 1952  O. C. LYTLE  2,604,833
HOE ATTACHMENT FOR TRACTORS
Filed May 17, 1950  2 SHEETS—SHEET 2
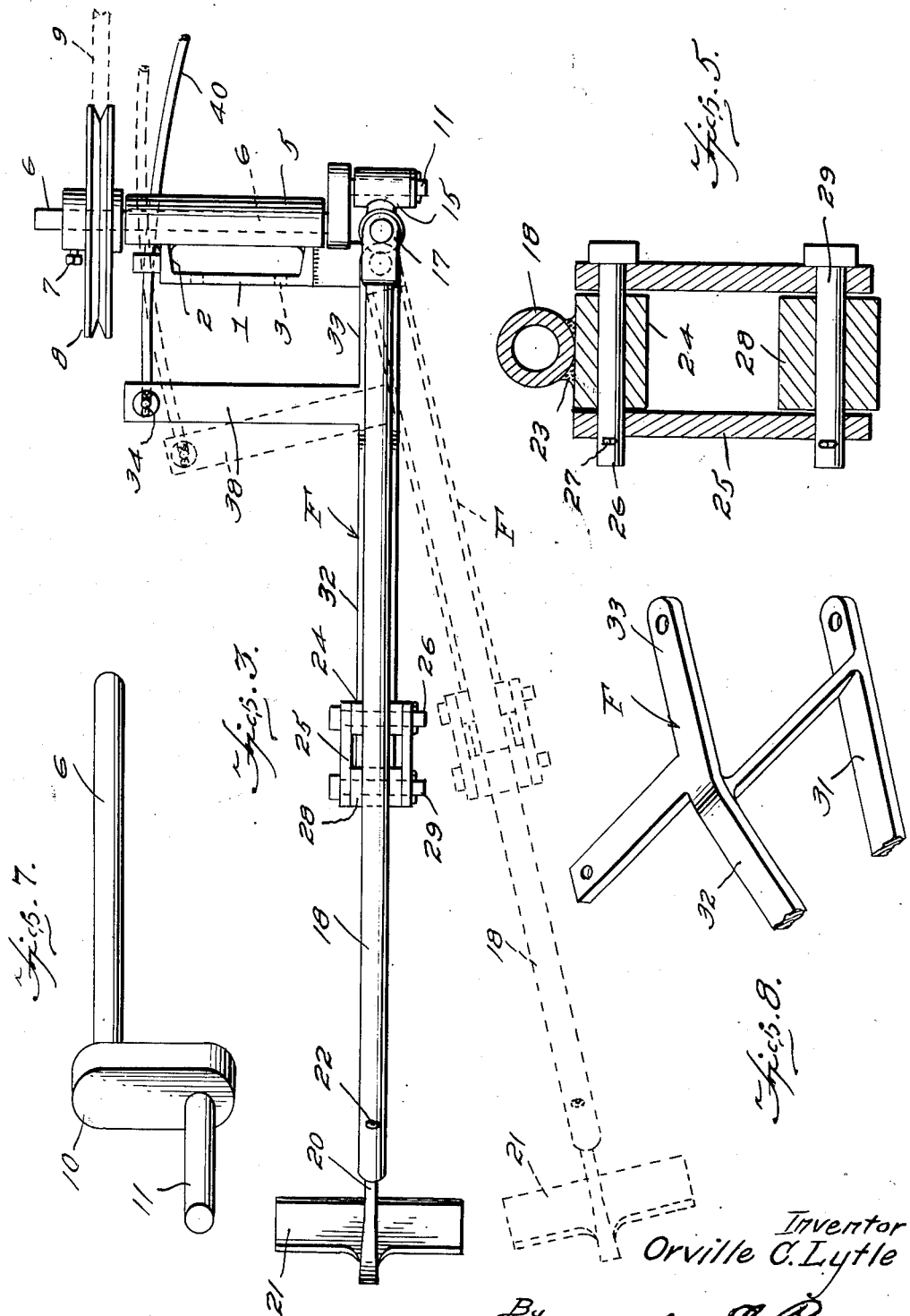
Inventor
Orville C. Lytle
By Wilfred E. Lawson
Attorney Patented July 29, 1952

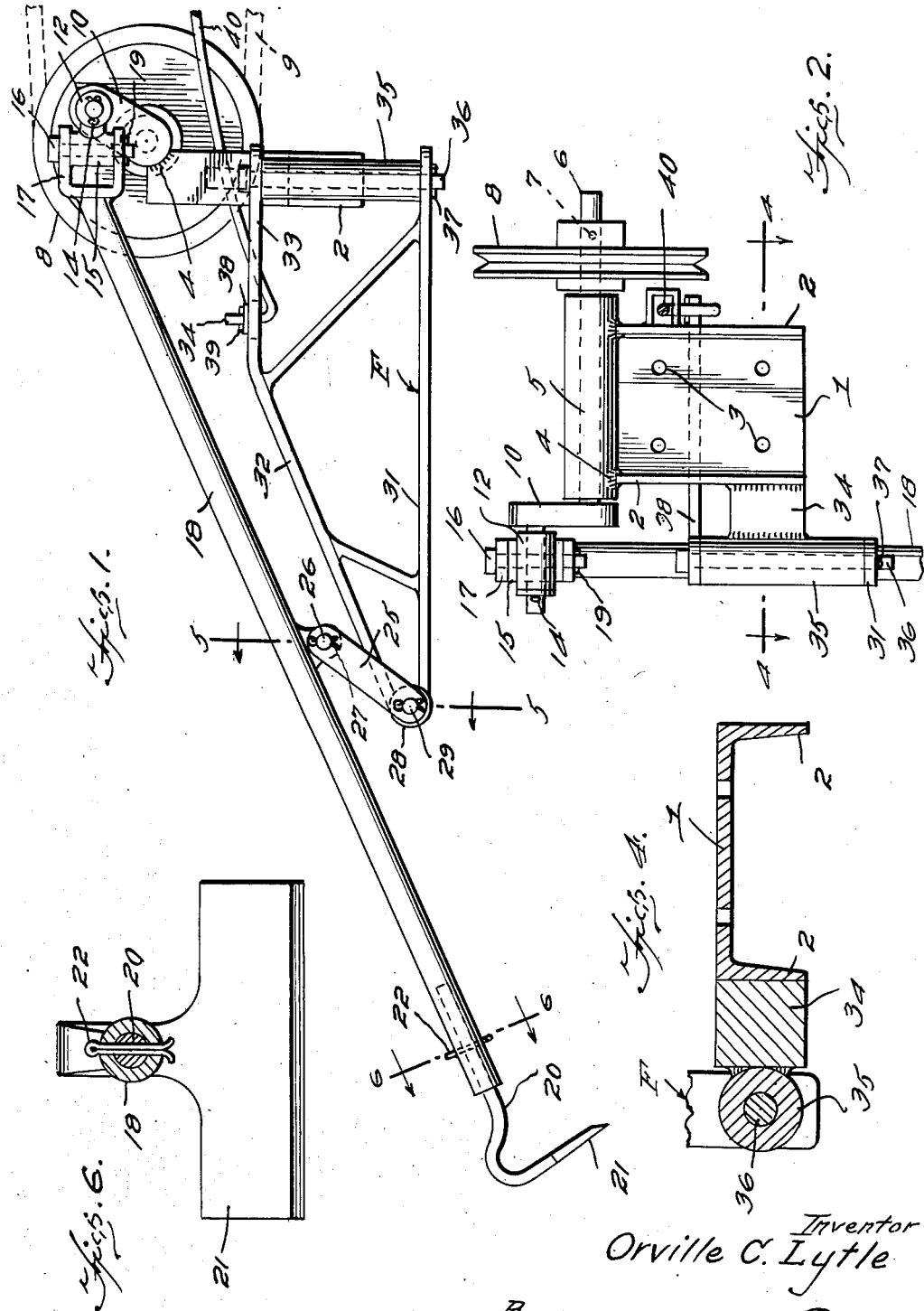

2,604,833

UNITED STATES PATENT OFFICE 2,604,833

HOE ATTACHMENT FOR TRACTORS

Orville C. Lytle, Kittanning, Pa.

Application May 17, 1950, Serial No. 162,515

3 Claims. (Cl. 97—45)

This invention relates to a hoe unit of a character to operate between plant rows or between plants of a row while in transit and it is an object of the invention to provide a unit of this kind which can be readily mounted in required position upon a tractor or other vehicle.

A further object of the invention is to provide a unit wherein is embodied a ground working member adapted to be operated mechanically from the vehicle to which the unit may be applied.

The invention consists in the details of construction and in the combination and arrangement of the several parts of my improved hoe unit whereby certain advantages are attained, as will be hereinafter more fully set forth.

In order that my invention may be better understood, I will now proceed to describe the same with reference to the accompanying drawings, wherein:

Figure 1 is a view in side elevation of a hoe unit constructed in accordance with an embodiment of the invention;

Figure 2 is a view in rear elevation of Figure 1 with the elongated rod in fragment;

Figure 3 is a view in top plan of the unit as comprised in Figure 1, a second position of certain of the parts being shown by broken lines;

Figure 4 is an enlarged detail sectional view taken substantially on the line 4—4 of Figure 2;

Figure 5 is an enlarged detail sectional view taken substantially on the line 5—5 of Figure 1;

Figure 6 is an enlarged detail sectional view taken substantially on the line 6—6 of Figure 1;

Figure 7 is a view in perspective of the drive shaft of the unit unapplied; and

Figure 8 is a fragmentary view in perspective of the inner end portion of the frame as herein comprised and unapplied.

In the embodiment of the invention as illustrated in the accompanying drawings, 1 denotes a relatively heavy body member or plate herein disclosed as oblong and provided along its longitudinal marginal portion with the outstanding reinforcing flanges 2. The body member or plate 1 is adapted to be rigidly secured to a cross front member or the like of a tractor or other vehicle with the longitudinal axis of the member or plate 1 vertically disposed and the flanges 2 inwardly directed. As shown in the drawings, the member or plate 1 is provided with the openings 3 for suitable bolts or the like for anchoring the member or plate in desired position but of course other means may be employed for this purpose.

Welded, as at 4, or otherwise rigidly secured to the upper free corner portions of the flanges 2, is the bearing sleeve 5 disposed across the upper end of the member or plate 1 and substantially entirely thereabove. Disposed through the sleeve 5 is a shaft 6 of a length to extend outwardly beyond the opposite ends of the sleeve 5.

One extending portion of the shaft 6 has keyed, as at 7, a pulley 8, adapted to be connected by the belt 9, shown by broken lines, with a power pulley or the like carried by the tractor or other vehicle to which the unit is employed.

The second or opposite extended portion of the shaft 6 carries a crank 10 of desired throw which is provided at its outer or free end portion with an outstanding pin 11, the axis of which being substantially parallel with the axis of the shaft 6. Freely mounted on the pin 11, is a sleeve 12 held in place by a cotter pin 14 disposed through the shaft 6 outwardly of the applied sleeve 12.

Rigid with the sleeve 12 is a second sleeve 15 at right angles to the sleeve 12 and positioned in advance thereof. Disposed through the sleeve 15 from above is a headed pivot bolt 16 which is also disposed through the spaced arms 17 extending outwardly from the inner extremity of an elongated rod 18. The arms 17 substantially snugly receive therebetween the sleeve 15. The pivot bolt 16 is held against displacement by a cotter pin 19, or the like, operatively engaged with the bolt 16 beneath the lower arm 17.

The outer end portion of the rod 18 is tubular to receive the shank 20 of the hoe 21 or other ground working member. The hoe or ground working member 21 can be readily removed as desired by withdrawing the holding cotter pin 22 disposed through the rod 18 and shank 20.

The rod 18 at a desired point intermediate its ends has welded, as at 23, an underlying sleeve 24 substantially perpendicular to the rod 18. Overlying the ends of the sleeve 24 are the upper end portions of the rigid links 25 and through which upper portions of the links 25 is directed the headed pivot member 26 held against accidental displacement of the cotter pin 27 or the like operatively engaged with the member 26 of an adjacent link 25.

The lower extremities of the links 25 overlie the opposite ends of a sleeve 28 carried by the forward free end portions of a frame F. Disposed through this sleeve 28 and the overlying portions of the links 25 is a headed pivot member 29 held against accidental displacement by a cotter pin 30 or the like, carried by the member 29 outwardly of the adjacent link 25.

The frame F is of a skeleton type and includes a straight bottom member 31 and a top member 32 disposed upwardly and rearwardly from the sleeve 28 and terminating in an arm 33 substantially parallel with the inner end portion of the member 31.

Rigidly attached, as at 34, to the flange 2 at the side of the member or plate 1 adjacent to the crank 10, is a sleeve 35 disposed in a direction lengthwise of the body member or plate 1. The rear or free end portion of the bottom member 31 of the frame F underlies the sleeve 35 and the arm 33 overlies the same. Disposed from above through the sleeve 35 and the adjacent portions of the bottom member 31 and arm 33 of the frame F is the headed pivot member 36 held against accidental displacement by a cotter pin 37 or the like, operatively engaged with the pivot member 36 below the bottom member 31 of the frame F.

Rigid with the arm 33 of the frame F and extending across and beyond the opposite side of the body member or plate 1, is an arm 38 to the outer or free extremity of which is operatively engaged, as at 39, an end portion of an elongated pull rod 40, rearwardly beyond the body member or plate 1 a distance to allow the same to be manipulated by an occupant of the tractor or the vehicle to which the unit is applied to laterally swing the frame F together with the rod 18 as desired.

The flange 2 of the body member or plate 1 adjacent to the pull rod 40, is provided with an outstanding guide loop 41 through which the rod 40 passes.

The unit is attached to the tractor or other vehicle to allow the hoe 21 or kindred ground working member to be effected between adjacent plant rows but when desired such hoe 21 or the like may be permitted to work between adjacent plants of a row by an occupant giving proper push upon the rod 40. As the machine travels along the plant row the oscillation of the rod 18 will cause the hoe 21 or the like to have required action on the soil.

From the foregoing description it is thought to be obvious that a hoe unit constructed in accordance with my invention is particularly well adapted for use by reason of the convenience and facility with which it may be assembled and operated.

I claim:

1. In a hoe attachment for tractors, an elongated member pivoted for lateral swinging movements at its forward end to the rear end of the tractor, a hoe including an elongated handle, said handle being obliquely inclined in an upward and forward direction and pivoted intermediate its ends to the rear end of said member, means mounted on said member and operatively connected with the power plant of the tractor and the upper end of said handle for imparting vertical oscillating motions to the handle and hoe, and manually actuated means for changing the lateral positions of said member as required to avoid damage to plants by the chopping movements of the hoe.

2. The invention as defined in claim 1, with the said member in the form of an open, substantially triangular frame, and the pivot mounting of the handle comprising a link pivoted at one end to the apex end of the frame and at its other end to the handle.

3. The invention as defined in claim 1, with a horizontal bearing offset from one side of the forward end of said member, a shaft journalled in said bearing, a crank at one end of said shaft, a bearing on the upper end of said handle and engaged by said crank, a pulley mounted on the other end of said shaft, and a wrapping connector leading from said pulley to the power takeoff of the tractor.

ORVILLE C. LYTLE.

No references cited.